Aug. 9, 1966 R. L. WAGNER 3,265,792
PROCESS FOR PREPARING A GRAINED LITHOGRAPHIC PLATE
Filed Oct. 4, 1963
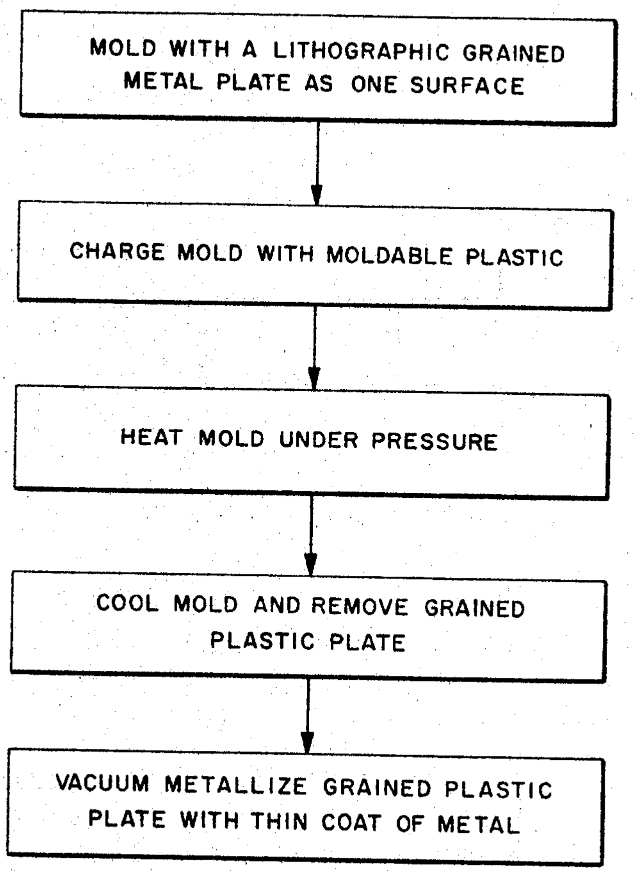
RICHARD L. WAGNER
*INVENTOR.*
BY
Eleanor R. Bartholomew
AGENT 3,265,792
Patented August 9, 1966

3,265,792

PROCESS FOR PREPARING A GRAINED LITHOGRAPHIC PLATE

Richard L. Wagner, Wilmington, Del., assignor to Hercules Powder Company, Wilmington, Del., a corporation of Delaware Filed Oct. 4, 1963, Ser. No. 313,766
14 Claims. (Cl. 264—129)

This invention relates to a process of preparing grained lithographic plates. More particularly, this invention relates to a process of preparing grained lithographic plates with a metallized surface.

Grained lithographic plates of one type or another have been known for a great many years. The first plate was merely a porous slab of Kelheim stone used by Alois Senefelder in 1796. Today in the art of fine lithographic printing, grained metal plates, particularly aluminum and zinc, are used. Probably the most important advantage of a grained plate over an ungrained plate is that it is more easily and evenly wet either by ink or water. In addition, the graining promotes better adhesion of the photosensitized coating, resulting in longer press runs and necessitates fewer changes in the ink-water balance during the press run. While there is no satisfactory way to absolutely characterize the graining on these plates, it can be generally described as a microscopic surface roughness essentially devoid of scratches. From a scientific point of view, it can be described in terms of grain depth and increased surface area. In general, the depth of the graining will vary from about 0.00015 inch to about 0.0015 inch and the ratio of the surface area of a grained plate to the surface area of an ungrained plate will vary from about 1.6 to about 6.0.

It is known to prepare such plates by covering a metal sheet with a slurry of finely divided abrasive material such as silica or pumice and then rolling glass or steel balls on the surface by means of a mechanically rotatable table (commonly known as "tub graining"). This process produces a high quality grained plate for long run lithographic printing jobs. However, the process is time consuming and messy while the resulting plates are costly and difficult to reproduce. Chemical etching, brush graining and sand blasting techniques are also used to prepare grained plates, but the products are either inferior to that obtained by the above-mentioned method or equally costly and difficult to reproduce.

It has now unexpectedly been found that excellent quality lithographic grained plates can be prepared by vacuum metallizing a thin metal coating on the surface of a plastic plate which has previously been lithographically grained by compression or injection molding using a mold having a lithographic grained surface.

Accordingly, this invention relates to a process for preparing a grained lithographic plate which comprises the steps of (1) replicating the graining of a lithographic grained metal master plate onto the surface of a moldable plastic substrate by heating the plastic under pressure in a mold in which a surface of the plastic comes into contact with the grained surface of said master plate, and (2) vacuum metallizing a thin coating of metal onto the grained surface of said plastic substrate.

It has been found that the vacuum metallized coating deposits evenly over the grained surface without decreasing the microscopic roughness so necessary for fine lithographic printing. In addition, the metallized coating adheres much more tightly to the grained plastic than it would be an ungrained plastic, thus allowing the plates to be used in long printing runs.

Any moldable thermoplastic or thermosetting polymeric compound can be used as the plastic substrate in the process of this invention. Exemplary moldable plastics are polyethylene, polypropylene, crystalline isoprene-propylene copolymers, crystalline ethylene-1-butene copolymers, crystalline ethylene-propylene copolymers, crystalline 1-butene-propylene copolymers, polystyrene, polyesters such as poly(ethylene terephthalate), and ethylene terephthalate-ethylene azelate copolymer, poly(alkylene oxides) such as isotactic poly(ethylene oxide), polyamides such as nylon, polyaldehydes such as poly(formaldehyde), polycarbonates such as the condensation product of p,p'-isopropylidene diphenol and phosgene, poly(vinyl alkyl ethers) such as poly(vinyl methyl ether), poly(vinyl acetals) such as poly(vinyl butyral), poly(vinyl chloride), vinyl chloride-vinyl acetate copolymers, vinyl chloride-vinylidene chloride copolymers, nitrocellulose, poly(vinylidene chloride), poly(ethyl acrylate), poly(methyl methacrylate), poly[3,3-bis(chloromethyl) oxetane], chlorinated and fluorinated ethylene polymers such as poly(tetrafluoroethylene), etc., and blends of these plastics with each other. In certain cases, it may be desirable to blend (alloy) one of the above plastics with a smal amount of an elastomer such as polyisobutylene, amorphous ethylene-propylene copolymers, cis-polyisoprene, ethylene-propylene-cyclopentadiene terpolymers, styrene-butadiene copolymers, styrene-acrylonitrile copolymers, styrene-methyl methacrylate copolymers, etc. In such cases, the amount of elastomer added will be limited so as to maintain the molding properties of the plastic. The thickness of the grained plastic substrate is not critical but will in general be at least about 3 mils. It can, of course, contain additives such as extenders, fillers, plasticizers, stabilizers, etc., but the presence or absence of such additives is immaterial to this invention. It is also possible to laminate the plastic to a paper backing, thus allowing the use of thinner plastic substrates with a commensurate saving in cost.

Any metal which can be vacuum metallized can be used as the metal coating in the process of this invention. Preferably, the metal will be aluminum. In addition to these, other metals such as zinc, copper, chromium, molybdenum, zirconium, titanium, nickel, magnesium and cadmium can be used. The thickness of the metallized coating can vary from a monomolecular layer to about 0.0015 inch. However, in practice, coating thicknesses of from about 0.0000001 inch to about 0.001 inch are preferred.

An lithographic grained metal plate can be used as the master plate in the molding step of this invention. Usually, the master will be a lithographic grained plate as used in the printing trade. However, a surface of the mold can be grained with a lithographic finish and used equally as well. These master plates can be prepared by any well-known method such as the tub graining method described above.

As stated above, the process of this invention comprises replicating the graining of a lithographic grained master onto the surface of a moldable plastic substrate and then vacuum metallizing a thin coating of metal onto the thus grained surface of the plastic. The graining can be replicated onto the surface of the plastic substrate by any of the well-known compression or injection molding techniques. For example, a metal frame of the desired dimensions can be placed on the metal master plate, filled with an amount of plastic molding powder calculated to fill the mold, placed in a press and heated under pressure. Another method which can be used is to inject molten plastic under pressure into a closed mold, one surface of which has been lithographically grained. The specific temperature, pressure and time period used will, of course, vary according to the specific plastic being molded. The conditions for molding the various plastics are well known and will be obvious to those skilled in the art. The vacuum metallization onto the grained plastic surface can be carried out using any of the well-known vacuum metallization procedures.

The lithographic plates of this invention can readily be converted into either positive or negative printing plates. For example, a negative working plate can be obtained by coating with a photo resist and exposing to ultraviolet light through a negative transparency so as to render the photo resist insoluble and oleophilic in the exposed areas. When the nonexposed image is dissolved away, the hydrophilic metal surface is laid bare and a positive printing plate results. A positive working plate can be made by coating with a photo resist, exposing through a positive transparency and removing the unexposed (soluble) resist as described above to reveal the metal. By etching away the metal coating, the oleophilic plastic substrate is revealed. Then the exposed (hardened) photo resist is removed, exposing the hydrophilic metal surface as a positive plate.

The accompanying flow sheet illustrates the process in accordance with this invention. As stated above, any convenient molding technique and vacuum metallization procedure can be used in carrying out the process.

The following examples are presented for purposes of illustration, parts and percentages being by weight unless otherwise specified.

*Example 1*

A lithographic grained polypropylene sheet was prepared as follows. A metal molding frame 0.016 inch thick and having interior dimensions of 10 x 14 inches was placed on the grained surface of a lithographic grained aluminum plate having a No. 6–0 lithographic finish. Powdered polypropylene having a molecular weight of approximately 600,000 in an amount calculated to fill the frame was spread on the surface of the aluminum plate. A metal plate was placed on top of the frame and the thus prepared mold placed in a press. The mold was heated for 10 minutes at a temperautre of 182° C. under a slight positive pressure and then for 5 additional minutes at the same temperature but at increased pressure of 500 p.s.i. The mold was rapidly cooled with water while still under pressure. The resulting grained polyproylene sheet was examined microscopically and found to be an excellent reproduction of the master plate.

The grained polypropylene plate was then placed in a bell jar equipped with an electrically heated tungsten filament. The tungsten filament was used to heat a clip of aluminum. The chamber was subject to a vacuum of $5 \times 10^{-4}$ mm. and the aluminum heated until it had vaporized. The surface of the resulting vacuum metallized plastic plate was examined microscopically and found to be essentially identical to the grained master plate. The metallized coating was measured and estimated to be 0.0000004 inch thick. An ungrained sheet of polypropylene was vacuum metallized exactly the same way and compared to the grained plate as produced above. A 1 x 2 inch strip of cellophane pressure sensitive tape was placed on the aluminized surface of the grained and ungrained sheets. When the tape was removed from the ungrained plate, the aluminum coating pulled away from the polypropylene and adhered to the tape. When the tape was removed from the grained plate, the aluminized coating was undamaged. A drop of water was placed on the aluminized surface of each plate and observed. The drop of water on the grained plate rapidly spread out, wetting the plate over a large area, while the drop on the smooth plate remained as a bead.

The grained plate was converted to a lithographic plate by coating with a commercial ink-receptive photo resist. After exposure to ultraviolet light through an image-bearing transparency and development of the plate, 1,200 copies were run on an offset lithographic press. The resulting prints were of excellent quality. The plate was examined and found to be undamaged, the metallized coating still adhering tightly to the grained polypropylene substrate.

*Example 2*

A lithographic grained polypropylene sheet was prepared and its grained surface vacuum metallized exactly as described in Example 1 except the aluminum was replaced with zinc. The surface of the resulting metallized plate was examined microscopically and found to be substantially identical to the grained master plate. The zinc coating was measured and estimated to be 0.0000005 inch thick. The water receptivity of its grained surface was excellent and the coating adhered tightly when tested with pressure sensitive tape.

*Example 3*

Two lithographic grained polystyrene sheets were prepared according to the molding procedure of Example 1. The polystyrene used in each sheet had a specific gravity of 1.06. One sheet was prepared exactly as described in Example 1, using a grained aluminum master plate having a No. 6–0 lithographic finish. The other sheet was grained with a stainless steel master plate having a 6–0 lithographic finish. The grained surface of each plate was vacuum metallized with an aluminum coating about 0.0000005 inch thick as described in Example 1. The surfaces of the resulting metallized plates were examined microscopically and found to be essentially identical to the grained master plates from which they were prepared. An ungrained control plate of polystyrene was also vacuum metallized with an aluminum coating of the same thickness. The three plates were tested for adherence of their metal coatings, using cellophane pressure sensitive tape as described in Example 1. When the tapes were removed, the coatings on the grained plates remained intact while the coating on the ungrained plate lifted with the tape.

*Example 4*

A lithographic grained polyethylene sheet was prepared from a sample of powdered polyethylene, having a molecular weight of approximately 150,000, by the molding process described in Example 1 with the single exception that a molding temperature of 174° C. was used. The resulting grained polyethylene was examined microscopically and found to be an excellent reproduction of the master plate. It was then placed in a bell jar and its grained surface vacuum metallized with an estimated 0.0000005 inch coating of aluminum as described in Example 1. An ungrained polyethylene control plate was also vacuum metallized with an aluminum coating of the same thickness. The two plates were tested for adherence of their metal coatings using cellophane pressure sensitive tape as described in Example 1. The coating on the grained plate remained intact while the coating on the ungrained plate lifted with the tape.

*Example 5*

A lithographic grained plastic sheet was prepared from a sample of poly[3,3-bis(chloromethyl)oxetane] having a molecular weight of approximately 300,000, using the molding procedure described in Example 1 except for the following modification in the molding cycle. The mold was first heated to 204° C. and held under a slight positive pressure for 1 minute. Then, maintaining the same temperature, the pressure was increased to 500 p.s.i. and held for 8 minutes. The resulting grained plastic sheet was examined microscopically and found to be identical to the master plate. The grained surface of the plate was then vacuum metallized with an estimated 0.0000005 inch aluminum coating as described in Example 1. The surface of the metallized plastic plate was examined microscopically and found to be essentially identical to the grained master plate. The water receptivity of its grained surface was excellent and the coating adhered tightly when tested with pressure sensitive tape.

*Example 6*

A lithographic grained plastic sheet was prepared from a sample of poly(formaldehyde), having a molecular weight of approximately 40,000, using the molding procedure described in Example 1 except for the following modifications in the molding cycle. The mold was first heated to 215° C. and held under a slight positive pressure for 1 minute. Then, maintaining this temperature, it was subjected to 500 p.s.i. for 4 minutes, decreased to a slight positive pressure for 1 minute and then again subjected to 500 p.s.i. for 4 minutes. The resulting grained poly(formaldehyde) sheet was examined microscopically and found to be an excellent reproduction of the master sheet. The grained surface of the plate was then vacuum metallized with an estimated 0.0000005 inch aluminum coating as described in Example 1. The surface of the metallized plastic plate was examined microscopically and found to be substantially identical to the grained master plate. The water receptivity of its grained surface was excellent and the coating adhered tightly when tested with pressure sensitive tape. In comparison, the metallized coating on an ungrained control plate lifted with the tape.

*Example 7*

A lithographic grained plastic sheet was prepared from a sample of a cellulose mixed ester containing 50% combined cellulose, 37% combined butyral groups and 13% combined acetyl groups following the molding procedure described in Example 1 except for the following modifications in the molding cycle. The mold was first heated to 149° C. and held under a slight positive pressure for 1 minute and then, maintaining this temperature, the pressure was increased to 620 p.s.i. and held for 8 minutes. The resulting grained plastic sheet was examined microscopically and found to be an excellent reproduction of the master plate. The grained surface of the plate was then vacuum metallized with an estimated 0.0000005 inch aluminum coating as described in Example 1. The surface of the metallized plastic plate was examined microscopically and found to be essentially identical to the grained master plate . The water receptivity of its grained surface was excellent and the coating adhered tightly when tested with pressure sensitive tape. In comparison, the metallized coating on an ungrained control plate lifted with the tape.

*Example 8*

A lithographic grained plastic sheet was prepared from a sample of a condensation polymer of p,p'-isopropylidene diphenol and phosgene, having a melting point of 268° C. and a specific gravity of 1.20, according to the molding procedure described in Example 1. The powdered condensation polymer was first dried to drive off absorbed water by heating for 4 hours. The mold was then closed, placed in a press and heated for 1 minute at 260° C. at a slight positive pressure. Then, maintaining the same temperature, it was subjected to a pressure of 500 p.s.i for 8 minutes. The resulting grained plastic sheet was examined microscopically and found to be identical to the master plate. The grained surface of the plate was then vacuum metallized with an estimated 0.0000005 inch aluminum coating as described in Example 1. The surface of the metallized plastic plate was examined microscopically and found to be essentially identical to the grained master plate. The water receptivity of its grained surface was excellent and the coating adhered tightly when tested with pressure sensitive tape. In comparison, the metallized coating on an ungrained control plate lifted with the tape.

*Example 9*

A lithographic grained plastic sheet was prepared from a sample of a poly(methyl methacylate), having a specific gravity of 1.19 and a refractive index of 1.49, according to the molding procedure described in Example 1 with the exception of the following modification in molding cycle. The mold was first heated at a temperature of 177° C. and held under a slight positive pressure for 2 minutes and then, maintaining the same temperature, it was subjected to a pressure of 620 p.s.i. for 8 minutes. The resulting grained plastic sheet was examined microscopically and found to be an excellent reproduction of the master plate. The surface of the plate was then vacuum metallized with an estimated 0.0000005 inch aluminum coating as described in Example 1. The surface of the metallized plastic plate was examined microscopically and found to be substantially identical to the grained master plate. The water receptivity of its grained surface was excellent and the coating adhered tightly when tested with pressure sensitive tape. In comparison, a metallized coating did not adhere tightly to an ungrained control plate and water tended to bead on its smooth surface.

*Example 10*

This example illustrates the use of a paper backed plastic.

A section of 80 lb. bleach kraft board coated by extrusion coating with a 1 mil layer of polypropylene (molecular weight of approximately 600,000) was placed in a mold, covered with an aluminum master plate grained with a No. 6–0 lithographic finish and pressed at a temperature of 170° C. under 500 p.s.i. for 5 minutes. The paper backed plate was cooled to room temperature in the press using a cold water quench. The graining on the polypropylene surface of the plate was found to be an excellent reproduction of the master plate. The surface of the plate was then vacuum metallized with an aluminum coating estimated to be 0.000005 inch thick as described in Example 1. The surface of the metallized paper backed plastic plate was examined microscopically and found to be essentially identical to the grained master plate. The water receptivity of its grained surface was excellent and the metal coating adhered tightly when tested with pressure sensitive tape.

What I claim and desire to protect by Letters Patent is:

1. A process for preparing a grained lithographic plate which comprises the steps of (1) replicating the grinding of a lithographic grained metal master plate onto the surface of a moldable plastic substrate selected from the group consisting of polyolefins, polystyrene, poly[3,3-bis(chloromethyl) oxetane], cellulose mixed esters, condensation polymer of p, p'-isopropylidene diphenol and phosgene, poly(formaldehyde), and poly(methyl methacrylate) by heating the plastic under pressure in a mold in which the surface of the plastic comes into contact with the grained surface of said master plate, and (2) vacuum metallizing a thin coating of a metal selected from the group consisting of aluminum, zinc, copper, chromium, molybdenum, zirconium, titanium, nickel, magnesium and cadmium onto the grained surface of said plastic substrate, said graining being 'ı microscopic surface roughness varying in depth from about 0.00015 inch to about 0.0015 inch.

2. The process of claim 1 wherein the moldable plastic substrate is a polyolefin.

3. The process of claim 2 wherein the polyolefin is polypropylene.

4. The process of claim 2 wherein the polyolefin is polyethylene.

5. The process of claim 1 wherein the moldable plastic substrate is polystyrene.

6. The process of claim 1 wherein the modable plastic substrate is poly[3,3-bis(chloromethyl) oxetane].

7. The process of claim 1 wherein the moldable plastic substrate is a cellulose mixed ester.

8. The process of claim 1 wherein the moldable plastic substrate is the condensation polymer of p,p'-isopropylidene diphenol and phosgene.

9. The process of claim 1 wherein the moldable plastic substrate is poly(formaldehyde).

10. The process of claim 1 wheerin the moldable plastic substrate is poly(methyl methacrylate).

11. The process of claim 1 wherein the moldable plastic substrate has a paper backing.

12. The process of claim 1 wherein the coating of metal is aluminum.

13. The process of claim 1 wherein the coating of metal is zinc.

14. A process for preparing a grained lithographic plate which comprises the steps of (1) replicating the graining of a lithographic grained metal master plate onto the surface of a polypropylene substrate by heating the polypropylene under pressure in a mold in which a surface of the polypropylene comes into contact with the grained surface of said master plate, and (2) vacuum metallizing a thin coating of aluminum onto the grained surface of said polypropylene substrate, said graining being a microscopic surface roughness varying in depth from about 0.00015 inch to about 0.0015 inch.

References Cited by the Examiner

UNITED STATES PATENTS

| | | | |
|---|---|---|---|
| 2,760,432 | 8/1956 | Wood | 101—149.2 |
| 2,834,724 | 5/1958 | Mendes | 117—107 |

ROBERT F. WHITE, *Primary Examiner.*

R. B. MOFFITT, *Assistant Examiner.*